United States Patent [19]

Ito et al.

[11] Patent Number: 5,557,465
[45] Date of Patent: Sep. 17, 1996

[54] LASER PLATE MAKING APPARATUS

[75] Inventors: Tatsumi Ito; Soichi Kuwahara, both of Kanagawa, Japan

[73] Assignee: Sony Corporation, Tokyo, Japan

[21] Appl. No.: 310,118

[22] Filed: Sep. 21, 1994

[30] Foreign Application Priority Data

Sep. 22, 1993 [JP] Japan .................................. 5-236843

[51] Int. Cl.$^6$ .............................. G02B 13/10; G11B 7/00
[52] U.S. Cl. .................... 359/669; 369/112; 369/122
[58] Field of Search .............................. 359/669; 369/112, 369/122

[56] References Cited

U.S. PATENT DOCUMENTS

| | | | |
|---|---|---|---|
| 4,333,173 | 6/1982 | Yonezawa et al. | 369/45 |
| 5,007,713 | 4/1991 | Yoshifusa et al. | 359/669 |
| 5,016,237 | 5/1991 | Nakamura et al. | 359/669 |
| 5,200,850 | 4/1993 | Iizuka et al. | 359/669 |
| 5,258,989 | 11/1993 | Raven | 359/669 |
| 5,373,395 | 12/1994 | Adachi | 359/669 |

FOREIGN PATENT DOCUMENTS

| | | |
|---|---|---|
| 2223984 | 4/1990 | United Kingdom . |
| WOA8706016 | 10/1987 | WIPO . |

*Primary Examiner*—Scott J. Sugarman
*Attorney, Agent, or Firm*—Lise A. Rode, Esq.; Pasquale Musacchio, Esq.; Jerry A. Miller

[57] ABSTRACT

A laser plate making apparatus is disclosed for forming a press plate from a form plate sheet. The apparatus includes a laser light source for providing a laser beam, a collimator lens, an objective lens and an anamorphic prism. The laser light source serves to emit a laser beam onto the form plate sheet through the collimator lens, the objective lens and the anamorphic prism. The anamorphic prism serves to shape the laser beam such that even if a focal stripe width is made small the focal depth is not substantially shortened.

8 Claims, 7 Drawing Sheets

PH: Original light emission point
PHa: Vertical light emission point of luminous flux after it has passed through oblique glass

LASER PLATE MAKING APPARATUS

BACKGROUND

1. Field of the Invention

The invention relates to a laser plate making apparatus for forming a press plate useful for, for example, a gravure printing press.

2. Background of the Invention

In many conventional laser plate making apparatus, a laser light source having a laser head is used to direct a laser beam onto a form plate sheet. The form plate sheet is wound around a plate cylinder which rotates in a main scanning direction. In addition, the laser light source is moved in the axial or sub scanning direction of the plate cylinder such that recesses are formed over substantially the entire surface of the form plate sheet to form a press plate. In this case, the recesses on the press plate form a halftone dot image.

FIG. 8 schematically shows a typical structure of a laser optical system employed in a laser plate making apparatus based on conventional technology. In FIG. 8, a laser head 1 is shown which includes a laser diode 2, a collimator lens 3 and an objective lens 4.

In FIG. 8, reference numeral 5 represents a beam profile of a laser beam emitted from the laser diode 2, and a luminous stripe width in the horizontal direction of the laser beam 5 is represented by $d_{LDH}$. Further, reference numeral 6 represents a focal position, or a beam profile of the laser beam on the form plate sheet, and the focal stripe width in the horizontal direction of the laser beam 6 is represented by $d_H$.

In the laser optical system of the example in FIG. 8, the laser beam 5 having a luminance stripe width $d_{LDH}$ is emitted from the laser diode 2 having a light emitting power of about 1 W and is collimated by the collimator lens 3. The laser beam 5 is then collected through the objective lens 4, so that it forms an image as a focal stripe width $d_H$ at the focal position of the objective lens 4. Here, the focal length of the collimator lens 3 is represented by $f_1$ and the focal length of the objective lens 4 is represented by $f_2$.

Typical values for the laser optical system shown in FIG. 8, are as follows:

luminance stripe width $d_{LDH}$=200 μm
focal length $f_1$ of the collimator lens 3=11.67 mm
focal length $f_2$ of the objective lens 4=7 mm
focal stripe width $d_H$=120 μm.

In this case, the focal stripe distance $d_H$ is determined by the relation of the following Equation 1.

$$d_H=(f_2/f_1)\cdot d_{LDH} \qquad \text{Equation 1}$$

In a laser optical system employed in a laser plate making apparatus for making a press plate, the position of the image surface frequently changes due to factors such as eccentricity of the plate cylinder, variations in the thickness of the form plate and others. As such, it is desirable to have a relatively deep focal depth in such laser optical systems in order to compensate for eccentricity and the like, that is, where there is a wide allowable range of positions for the image surface in which an image can be clearly formed.

Here, the focal depth of the laser plate making apparatus will be considered.

As shown in FIG. 9, a numerical aperture (NA) of a lens LZ can be expressed as NA=N sin θ$_2$ (N represents a refractive index of the lens LZ) when an opening angle of a bundle of rays $L_1$ is represented by θ$_2$. In a case of an optical pickup for reading pits of a compact disc or the like, since the laser beam is utilized under the condition that a part of the bundle of rays of the laser beam is blocked by the lens LZ, or it is so-called eclipsed, the NA of the lens LZ directly relates to the focal depth.

However, in the laser plate making apparatus, since the efficiency of the optical power is important, the optical system is configured such that the laser beam as the flux of light in an optical system of the lens LZ or the like is not eclipsed. Therefore, in the laser plate making apparatus, the optical combination efficiency is increased. Accordingly, in the laser plate making apparatus, the width $D_1$ of the laser beam incident on the lens LZ is smaller than the effective diameter $D_2$ of the lens LZ, and thus an effective NA (hereinafter referred to as an effective NA) becomes different from the NA of the lens LZ. The effective NA is expressed as Equation 2.

$$\text{Effective } NA=N \sin \theta_1 \qquad \text{Equation 2}$$

(N represents a refractive index of the lens LZ)

Here, consideration is made on how much the size of the beam spot will be changed when the focus is deviated (defocused) in terms of focal depth. The changing rate of the focal point is expressed as Equation 3.

$$\text{changing rate of focal point}=\tan \theta_1 \approx \sin \theta_1 \propto NA \qquad \text{Equation 3}$$

Finally, if the focal depth is set to ΔZ, the focal depth ΔZ is proportional to $(f_2/f_1)$ as shown in Equation 4.

$$\Delta Z \propto f_2/f_1 \qquad \text{Equation 4}$$

In the example in FIG. 8, it is proportional to $(f_2/f_1)$=0.6. This value is a value of the laser plate making apparatus which is made into practical use by the present applicant, and it is sufficient to compensate for the aforesaid eccentricity and the like.

However, it is desirable to further improve the resolution in such laser plate making apparatus. A focal stripe width $d_H$ of approximately 70 μm on the form plate sheet is desired in order to achieve a suitable improvement in resolution. Further, since the focal stripe width $d_v$ in the vertical direction is considerably small as compared with the focal stripe width $d_H$ in the horizontal direction (in the example in FIG. 8, stripe width $d_v$ is approximately 0.6 μm), it is sufficient to consider only the focal stripe width $d_H$ in the horizontal direction.

In this way, in the example of the laser optical system in FIG. 8, when a necessary focal length $f_2$ of the objective lens 4 is calculated under the condition that the focal stripe width $d_H$=70 μm, $f_2=f_1\cdot(d_H/d_{LDH})$=11.67×(70/200)≈4.08 mm is obtained from the above Equation 1.

However, if the above value is employed, the focal depth ΔZ becomes ΔZ∝0.35 from Equation 4, which is about a half the value as compared with that in the aforesaid prior art, resulting in a laser head having a shallow focal depth. Therefore, the above-described errors such as eccentricity of the plate cylinder, thickness of the form plate sheet or the like cannot adequately compensated for, and hence high resolution is difficult to achieve. Further, it is substantially difficult to reduce eccentricity and other errors up to about half or below as compared with that of the prior art by arranging other portions of the laser plate making apparatus due to high cost.

As such, an object of the present invention is to provide a laser plate making apparatus having a laser head wherein the focal depth is substantially maintained if the focal stripe width is made relatively small.

SUMMARY OF THE INVENTION

An apparatus for forming a press plate from a form plate sheet which includes a laser light source for providing a laser beam, a collimator lens positioned adjacent to said laser light source for collimating said laser beam and an objective lens positioned adjacent to said collimator lens for collecting said laser beam and for forming an image on said form plate sheet suitable for forming a press plate, wherein said image includes a focal stripe. The apparatus further includes an anamorphic prism positioned between said collimator lens and said objective lens for substantially maintaining focal depth of said laser beam as said focal stripe is reduced.

DETAILED DESCRIPTION OF THE INVENTION

Figure 8:
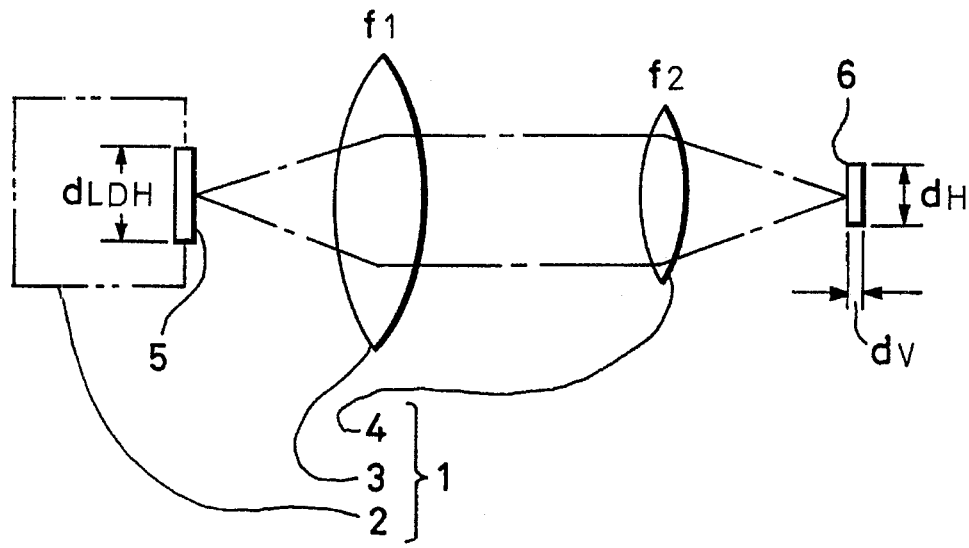
FIG. 8 is a schematic diagram for explaining prior art.
Figure 9:
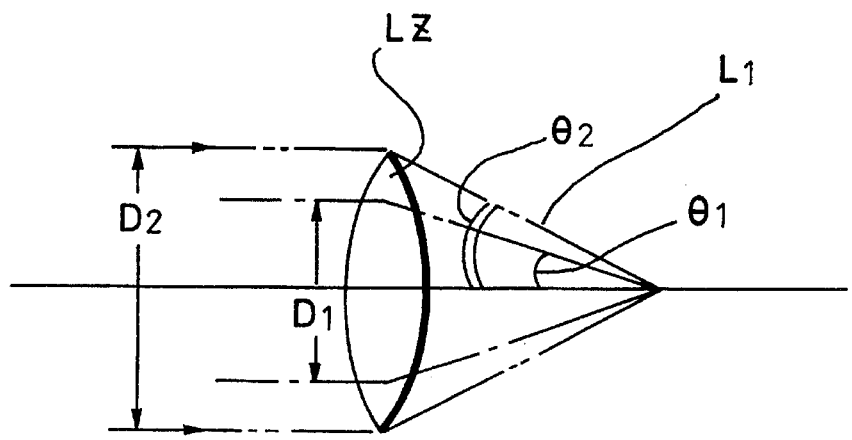
FIG. 9 is a schematic diagram for explaining the effective NA of the lens.

An embodiment of the invention will hereinafter be described with reference to the drawings. In the drawings referred to below, parts corresponding to those shown in FIG. 8 and FIG. 9 have the same reference numerals.

Figure 2:
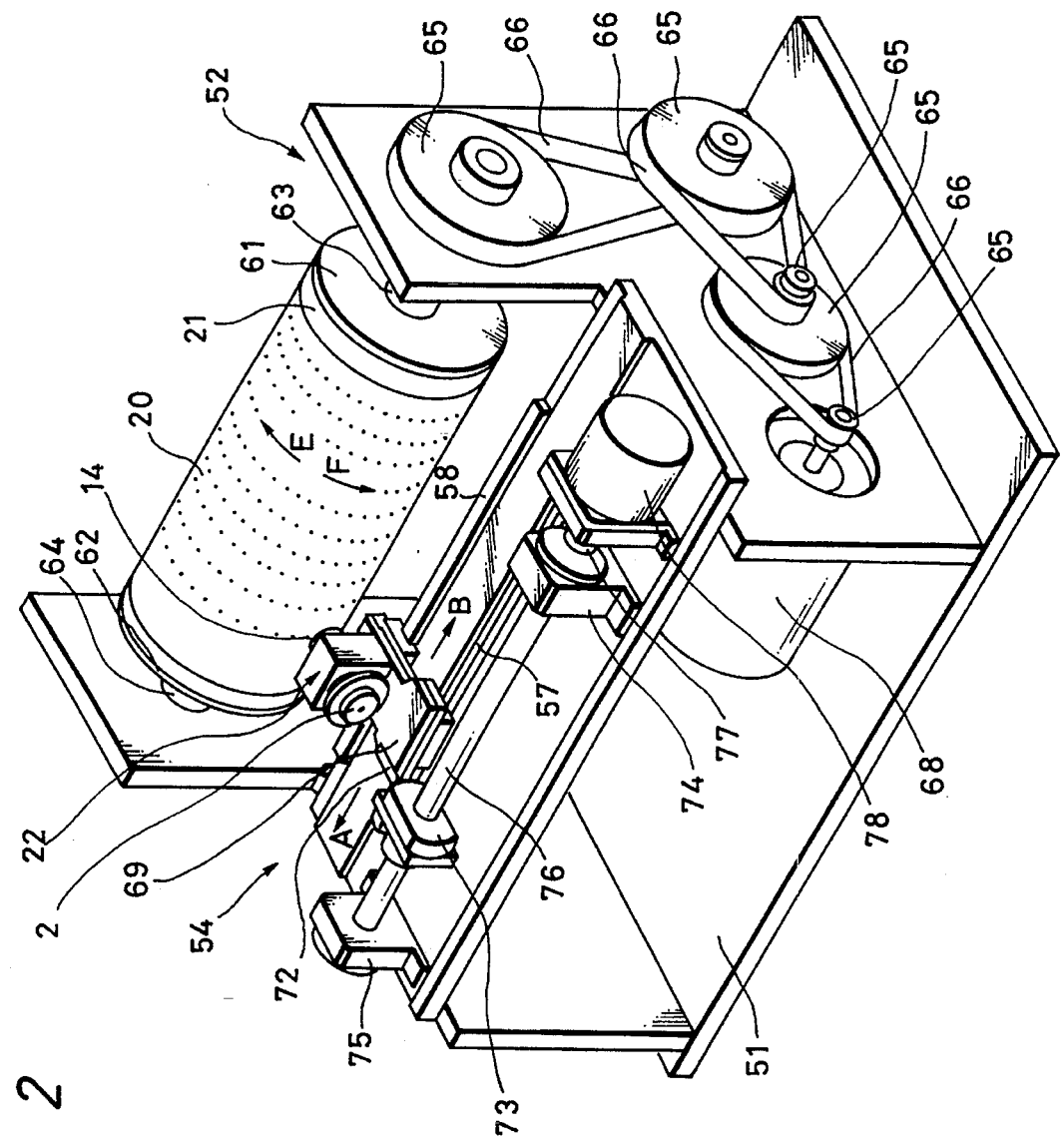
FIG. 2 is a perspective view showing the structure of the laser plate making apparatus according to the invention.

FIG. 2 shows an embodiment for the structure for the laser plate making apparatus. In FIG. 2, reference numeral 51 represents a base, and there are provided a plate cylinder rotating unit 52 and a laser head moving unit 54 on the base 51.

A laser head 22 which serves to emit a laser beam is arranged to be capable of moving along guide rails 57, 58 in the direction of arrows A (left), B (right), or the axial direction of a plate cylinder 21. An objective lens 14 is disposed at the plate cylinder 21 side of the laser head 22. In addition, a laser diode 2 is disposed and fixed on the opposing side of the plate cylinder 21. The laser diode 2 may be a semiconductor laser and serves as a laser light source. The laser diode 2 is similar to that shown in the example in FIG. 8 and has an emitting power of approximately 1 W.

The plate cylinder 21 is typically a cylinder made of a metal. A form plate sheet 20 made of synthetic resin is wound around the side surface of the cylinder and fixed thereto. Caps 61, 62 made of metal are fixed to both ends of the plate cylinder 21. The caps 61, 62 include shafts 63, 64, respectively, projecting in the axial direction of the plate cylinder 20.

Shaft 63 is coupled to a plate cylinder rotating motor 68 through five pulleys 65 and three belts 66. When the plate cylinder rotating motor 68 is rotated, the plate cylinder 21 around which the form plate sheet 20 is wound is rotated in the direction of arrow E (clockwise) or in the direction of arrow F (counterclockwise) which is the main scanning direction opposite to arrow E.

A laser head mounting stage 69 including a laser head moving unit 54 is fixed to a moving member 73 through an arm 72. The moving member 73 is meshed with a ball screw 76 disposed between bearings 74 and 75. The ball screw 76 is connected to a laser head moving motor 78 through the bearing 74 and a shaft joint 77.

Thus, when the motor 78 rotates, the moving member 73 is moved in the direction of arrow A or the direction of arrow B, so that the laser head 22 which is integrally mounted on the moving member 73 through the arm 72 and the laser head mounting stage 69 is moved in the direction of arrow A or the direction of arrow B along the guide rails 57, 58.

When the plate making is carried out on the form plate sheet 20, the laser head 22 is first moved to the end portion in the direction of arrow B. Then, the laser diode 2 is controlled in its on/off state and in its intensity of light while the plate cylinder 21 is rotated in the direction of arrow E, i.e., opposite to the direction of arrow F, so that a half tone dot image made of recesses is formed on the form plate sheet 20 by the laser beam that is irradiated onto the form plate sheet 20 by way of the objective lens 14 constituting the laser head 22. When the scanning of one line of the main scanning is completed, the laser head 22 is moved in a step feeding manner in the direction of arrow A (sub scanning direction). Thus, a so-called press plate on which an image is formed on the entire surface of the form plate sheet 20 can be manufactured.

Figure 1:
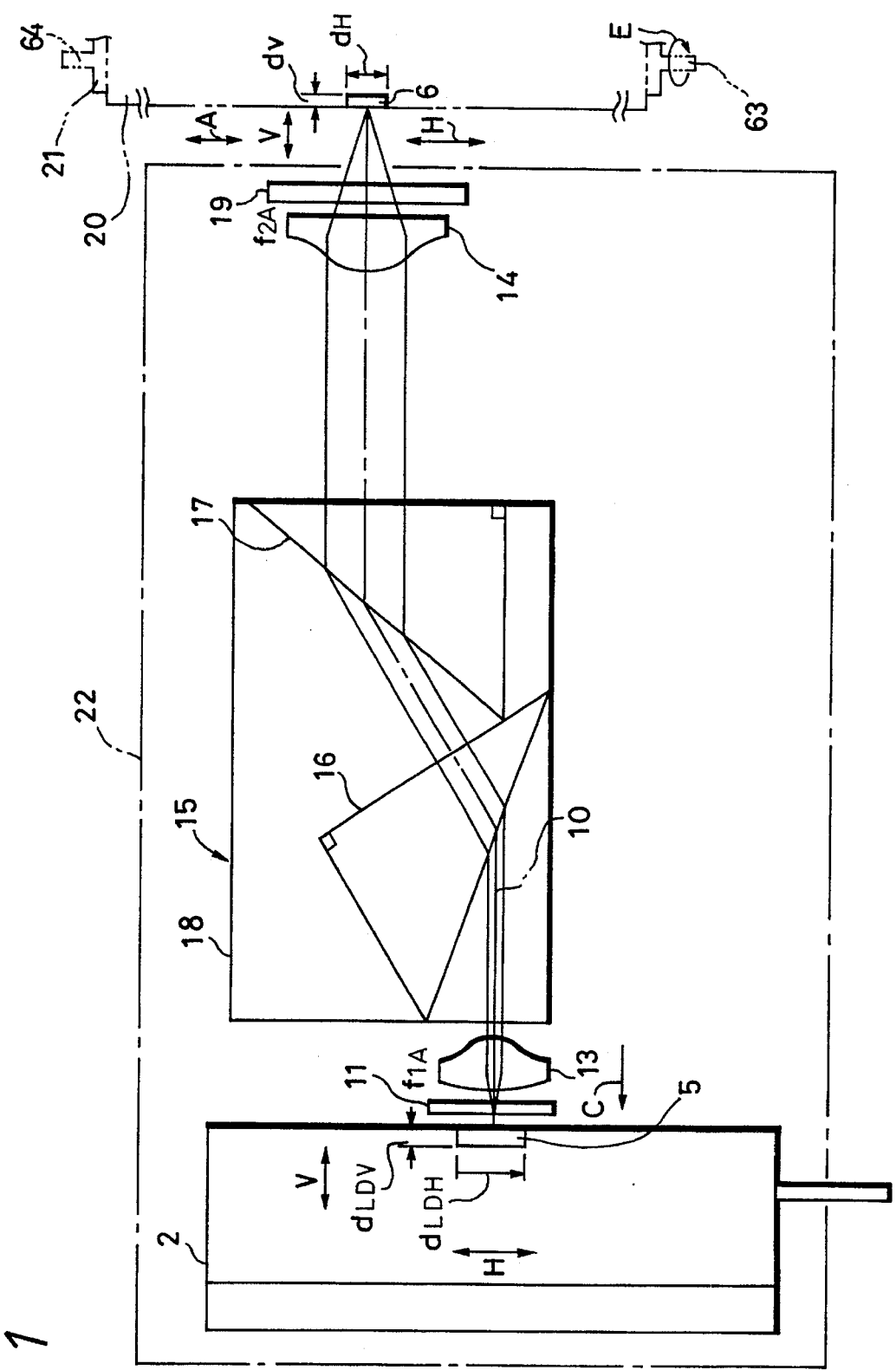
FIG. 1 is a schematic diagram showing a structure for a main portion of an embodiment of the laser plate making apparatus according to the invention.

FIG. 1 shows in detail a structure for a portion of the apparatus including the laser head 22 of the example of FIG. 2. The laser diode 2 for the laser head 22 may be, for example, of the type manufactured by SONY Corporation designated as SLD324ZT having a laser oscillation wavelength is 810 nm.

The laser beam 5 emitted from the laser diode 2 has a rectangularly shaped cross section and is formed into parallel light after passing through a glass plate 11 and collimator lens 13 having a focal length $f_{1A}$, and is incident on an anamorphic prism 15 which serves as a beam shaping element. The glass plate 11 is fabricated from a material conforming to military standard 517642 such as that manufactured by SHOTT Corp. and designated as BK-7 or other similar material. Here, the collimator lens 13 can be moved by a moving element (not shown) in the direction of an optical axis 10 (the direction of arrow C or its opposite direction).

The anamorphic prism 15 is configured such that two triangular column shaped prisms (hereinafter referred to as triangular prism) 16, 17 made of material BK-7 are affixed to a base plate 18 made of aluminum. An upper surface and a bottom surface of the triangular prisms 16, 17 are shaped into a right angle triangle.

As will be understood from FIG. 1, the laser beam emitted from the collimator lens 13 is incident on an oblique side surface (first surface) of the triangular prism 16 of the anamorphic prism 15, and then refracted to be emitted from a height side surface. Then, it is further incident on an oblique side surface of the triangular prism 17 and refracted to be emitted from a height side surface.

The laser beam emitted from the triangular prism 17 converges as a laser beam 6 through the objective lens 14 and a glass plate 19 which is fabricated from material BK-7 onto the form plate sheet 20 which is wound around the plate cylinder 21 rotating in the direction of arrow E (the direction opposite to the main scanning direction of the laser beam). Further, the focusing surface has a rectangular shape.

In this case, the laser head 22 having the laser diode 2, the collimator lens 13, the anamorphic prism 15 and the objective lens 14 as previously described is fixed on the laser head mounting stage 69, and the laser head mounting stage 69 is shifted in the direction of arrow A (sub scanning direction), whereby, as described above, a two-dimensional image of intaglio is formed on the substantially entire surface of the form plate sheet 20, and thus a press plate is manufactured.

In addition, since the laser beam 5 is controlled in its on/off state and/or in its intensity of light by a control apparatus (not shown), a plate of halftone dot image having a gradation corresponding to the depth of the recess can be formed on the press plate.

Further, in the example in FIG. 1, the laser beam 5 and the laser beam 6 are exaggerated for clarity.

Here, an example of the size and focal depth of the laser beams 5, 6 of the example in FIG. 1 will be described.

The anamorphic prism 15 is a prism which can change a beam profile in only one direction (in FIG. 1, only the horizontal direction (sub scanning direction) of the laser beam 5, or only the focal stripe width $d_H$ of the laser beam 6) of the laser beams incident thereon, by combining the two triangular prisms 16, 17, as shown in FIG. 1.

Therefore, focal depths $\Delta_{ZV}$, $\Delta_{ZH}$ will be considered by dividing the laser beams 5, 6 into its vertical direction V and horizontal direction H.

Figure 3:
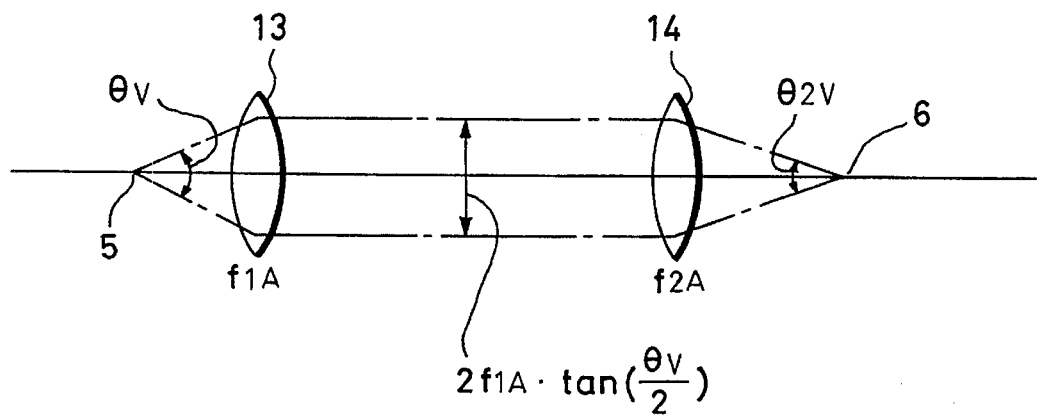
FIG. 3 is a schematic diagram for explaining the effective numerical aperture (NA) of a lens relating to the laser beam in the vertical direction.

The beam profile of the laser beam 5 is not substantially changed in the laser beam 6 in the vertical direction V, as shown in FIG. 3. As such, it may be considered that the anamorphic prism 15 is omitted (if magnification ratio of the anamorphic prism 15 is represented by m, then m=1).

The laser beam 5 emitted at an angle of divergence $\theta_V$ (in diode 2, about 30°) is made to have a width of bundle of rays $2f_{1A} \cdot \tan(\theta_V/2)$ between the collimator lens 13 and the objective lens 14.

An effective NA of the objective lens 14 can be expressed as Equation 5.

$$\text{effective } NA = N \sin \theta \approx N \tan \theta \approx (f_{1A}/f_{2A}) \tan (\theta_V/2) \quad \text{Equation 5}$$

Figure 4:
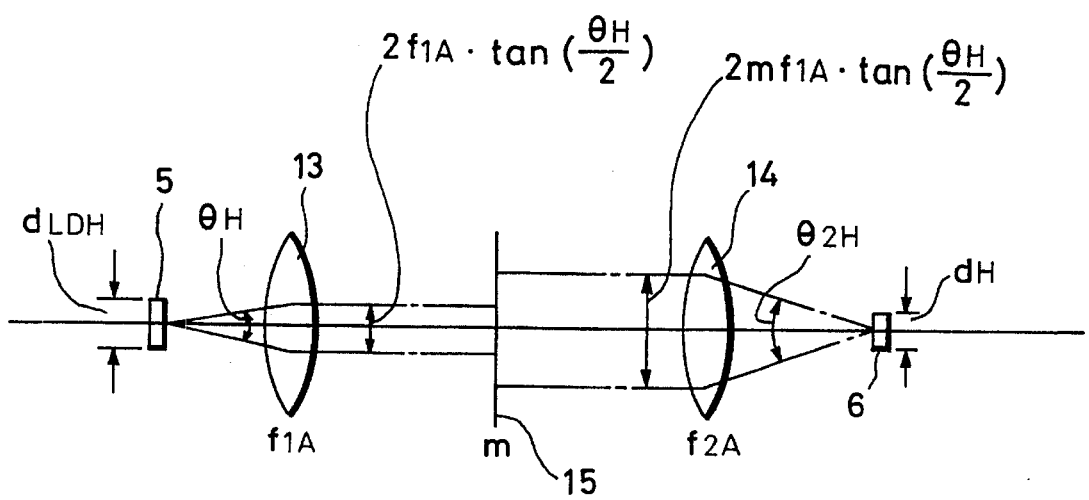
FIG. 4 is a schematic diagram for explaining the effective NA of the lens relating to the laser beam in the horizontal direction.

Therefore, it is understood that the focal depth $\Delta_{ZV}$ of the laser beam 6 in the vertical direction V is proportional to $(f_{2A}/f_{1A})$ Next, as for the horizontal direction H, if consideration is made on the fact that the beam profile of the laser beam 5 is enlarged to the magnification ratio of m times that of the anamorphic prism 15 in the laser beam 6, it is understood that a relation of FIG. 4 and the illustration shown in FIG. 4 can be established.

That is, the width of bundle of rays in the collimator lens 13 side of the anamorphic prism 15 becomes $2f_{1A} \tan (\theta_H/2)$ ($\theta_H$ is an angle of divergence of the laser beam 5 in the horizontal direction, and in laser diode 2, is about 10°), and thus the width of bundle of rays in the objective lens 14 side becomes m times the value, or $2_m f_{1A} \tan(\theta_H/2)$.

In FIG. 4, a ratio of image height, that is, a ratio between the luminance stripe width $d_{LDH}$ and the focal stripe width $d_H$ can be expressed as Equation 6 in accordance with the relation of the image formation.

$$(d_H/d_{LDH}) = (f_{2A}/f_{1A}) \times (1/m) \quad \text{Equation 6}$$

Here, the effective NA of the objective lens 14 can be expressed as Equation 7, and when Equation 6 is substituted for Equation 7, it can be expressed by Equation 8.

$$\text{effective } NA = N \sin \theta_{2H} \approx N \tan \theta_{2H} \approx \tan \theta_{2H} = \{mf_{1A} \tan (\theta_H/2)\}/f_{2A}$$
$$\text{Equation 7}$$

$$\text{effective } NA = (d_{LDH}/d_H) \times \tan (\theta_H/2) \quad \text{Equation 8}$$

As will be understood from Equation 8, the effective NA of the objective lens 14 is uniquely decided in accordance with a specification of the laser diode 2 (in this case, the angle of divergence $\theta_H$, the luminance stripe width $d_{LDH}$) and the required spot size, or the focal stripe width $d_H$, regardless of the collimator lens 13, the anamorphic prism 15 and the objective lens 14.

Therefore, in order to extend or deepen the focal depth $\Delta Z$, consideration may be made only on the vertical direction V in which the ratio of the focal length ($f_2/f_1$) is increased and the anamorphic prism 15 having the spectral magnification is employed to obtain a necessary focal stripe width $d_H$.

In consideration of what has been described above, in the laser optical system of the example in FIG. 1, each value is decided as follows:

luminance stripe width $d_{LDH}$=200 μm focal length $f_{1A}$ of the collimator lens 13=4.5 mm effective NA of the collimator lens 13=0.53 magnification m of the anamorphic prism 15=6 focal length $f_{1A}$ of the objective lens 14=9 mm effective NA of the objective lens 14=0.5 focal stripe width $d_H = d_{LDH} \times (f_{2A}/f_{1A})/m = 200$ μm×2/6 =66.7 μm In this case, according to the example of FIG. 1 in which the anamorphic prism 15 is inserted and disposed between the collimator lens 13 and the objective lens 14, the focal stripe width $d_H$ on the form plate sheet 20 becomes 66.7 μm, which is about 60% or below as compared with 120 μmm that has been described in the prior art. In addition, as for the focal depth $\Delta Z$, since the value of $\Delta Z$ is proportional to $(f_2/f_1)$=2, the value is improved by about three times as compared with the value of the focal depth $\Delta Z$ in the prior art in which it is proportional to $(f_1/f_1)$=0.6. Thus, since the focal depth $\Delta Z$ is also improved in accordance with the fineness of the focal stripe width $d_H$, there can be manufactured a press plate which yields an image of high resolution. Further, as for the beam shaping element, a cylindrical lens may be employed as a substitute for the anamorphic prism 15 to produce the same effect.

Further, when the collimator lens 13 is moved in the direction of arrow C by a moving element (not shown), defocus can take place at the collimator lens 13. As a result, astigmatism takes place at the anamorphic prism 15, causing a change in beam profile of the laser beam 6 irradiated onto the form plate sheet 20. Thus, it is possible to increase the focal stripe width $d_H$. In this way, it is possible to construct a laser plate making apparatus in which resolution can be continuously changed.

Similarly, if the collimator lens 13 is arranged to be capable of moving in the direction of arrow C or the direction opposite thereto, the beam profile (that is, an area expressed by $d_H \times d_V$) of the laser beam 6 can be changed. Therefore, a so-called gradation expression can be changed.

Further, the laser beam emitted from the anamorphic prism 15 is made into substantially a parallel beam in both the vertical and horizontal directions. For example, if an influence of the higher image height (this image height is high in the horizontal direction H, and is equal to the luminance stripe width $d_{LDH}$ =200 μm) of the laser beam 5 is taken into consideration, at the emitting end of the collimator lens 13, $$\arctan(d_{LDH}/f_1) = \arctan(200 \text{ μm}/4.5 \text{ mm}) = 2.5°.$$

Conversely, at the emitting end of the anamorphic prism 15, the magnification becomes about 1/m, and hence it is improved to be about 0.42°. Therefore, even if the objective lens 14 is provided with an automatic focusing system which is made of a servo to keep constant the distance from the surface (recess formed surface) of the form plate sheet 20 so that the objective lens 14 follows the surface of the form plate sheet 20, there is little influence upon the combination efficiency and image forming performance. Thus, there is obtained an advantage that the optical system is excellent in operating performance and extensiveness.

Figure 5:
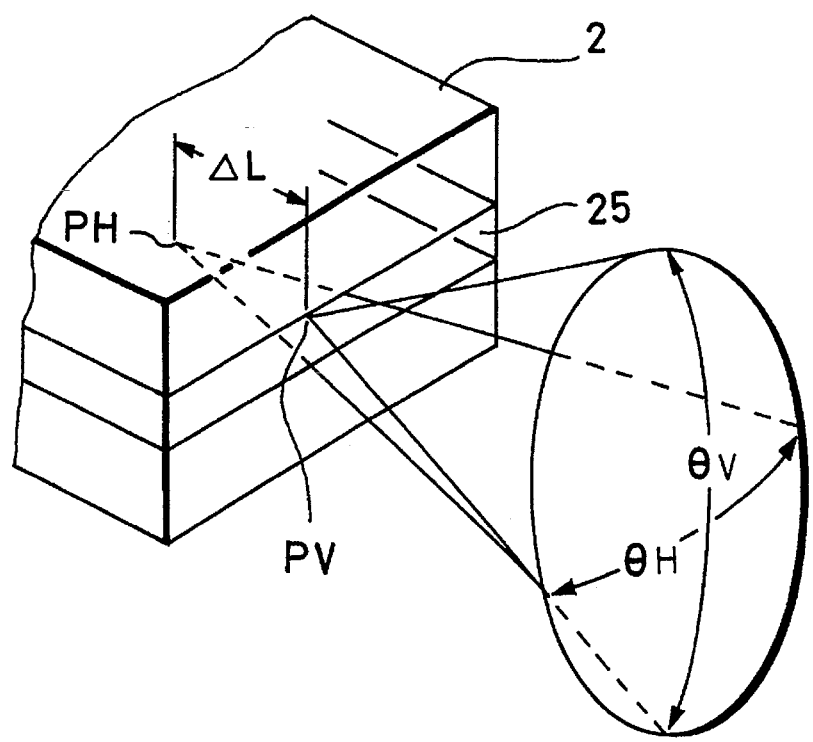
FIG. 5 is a schematic diagram for explaining the astigmatic difference of the laser diode.

FIG. 5 is a schematic diagram useful for explaining the astigmatic difference of the laser diode 2.

As will be understood from FIG. 5, the light emission points of the laser beam 5 emitted from an active layer 25 at the junction are different by an astigmatic difference ΔL in the optical axial direction between a light emission point PH which corresponds to the angle of divergence $\theta_H$ in the horizontal direction and a light emission point PV which corresponds to the angle of divergence $\theta_V$ in the vertical direction. This laser diode 2 of the embodiment has the astigmatic difference ΔL of approximately 25 μm.

Figure 6:
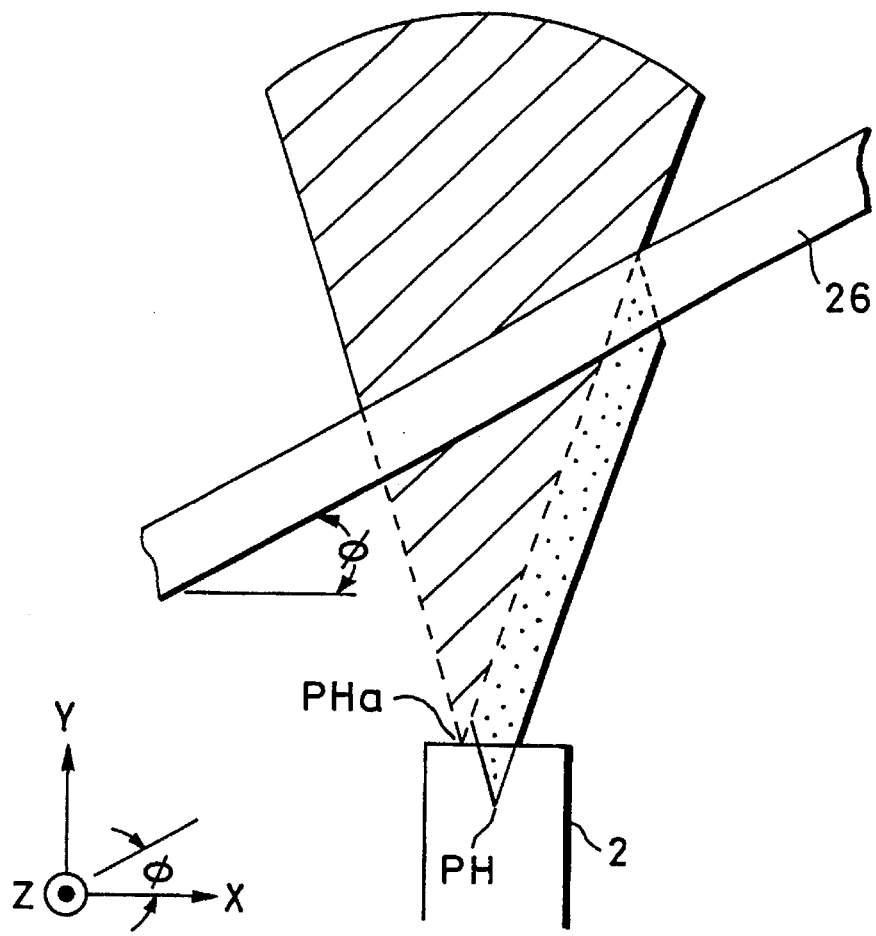
FIG. 6 is a schematic diagram for explaining the compensation of the astigmatic difference.

FIG. 6 is a diagram for explaining the principle of compensation for the astigmatic difference ΔL.

In order to compensate the astigmatic difference ΔL, a parallel flat plate glass 26 is disposed at a position of a plane which is decided by rotating an XZ-plane in a counterclockwise direction by, for example, φ degrees. If a bundle of rays irradiated from a spot light source is incident on the parallel flat plate glass 26 thus disposed from an oblique direction as shown in FIG. 6, when the bundle of rays irradiated from a spot light source on the XY-plane is incident in an oblique direction, as for the light within the XY-plane and light within the YZ-plane, there is an astigmatic difference generated between a position of the original light emission point (for example, a light emission point corresponding to the angle of divergence $\theta_H$ in the horizontal direction) PH and a position of the apparent light emission point PHa after the light has passed the parallel flat plate glass 26. By using this, the light emission point PH located rearward can be shifted to the virtual light emission point PHa at the forward position by the amount of the original astigmatic difference ΔL.

In this way, it is possible to cancel the astigmatic difference between the light emission point PH which corresponds to the angle of divergence $\theta_H$ and the light emission point PV which corresponds to the angle of divergence $\theta_V$.

When this is applied to the optical system in FIG. 2, the collimator lens 13 is shifted in the direction of arrow C. When this occurs, a bundle of rays passed through the collimator lens 13 is incident obliquely on the oblique side surface of the triangular prism 16 which constitutes the anamorphic prism 15. Therefore, the light emission point PH corresponding to the angle of divergence $\theta_H$ in the horizontal direction shifts forwardly to the apparent light emission point PHa, and thus it can be made coincident with the position of the light emission point PV corresponding to the divergence angle $\theta_V$ in the vertical direction.

Thus, when the astigmatic difference $\theta_L$ is compensated, even if the laser beam 6 on the form plate sheet 20 is changed in the optical axis direction (this change being caused by, for example, a change in thickness of the form plate sheet 20 or the like), the change of the laser beam 6 in its beam profile (area expressed by $d_{H \times dV}$) can be suppressed to be small as compared with a case where the astigmatic difference is not compensated.

Further, in the example of the structure of the main portion shown in FIG. 1, since the luminance stripe width $d_{LDV}$ of the laser diode 2 in the vertical direction (actually, in the example shown in FIG. 1, direction perpendicular to the surface of the sheet of paper) is about 1 μm, and the image height component can be considered practically negligible, the vertical lateral direction is made to be a parallel beam after it has passed the collimator lens 13. However, the horizontal lateral direction is made to be a widened beam even after it has passed the collimator lens 13 due to the image height component (the luminance stripe width $d_{LDH}$ in the horizontal direction)(in the example in FIG. 1, since the collimator lens 13 has the focal length $f_{1A}$ of 4.5 mm and the luminance stripe width $D_{LDH}$ is 200 μm, as described above, it has an angle of divergence of approximately 2.5°), the focal depth becomes shallow due to the deterioration of the combination efficiency with the objective lens 14 and lowering of the effective NA of the objective lens 14.

In order to reduce the influence of the image height component, the focal length of the collimator lens 13 may be elongated or an optical path length from the collimator lens 13 to the objective lens 14 may be shortened. However, it is disadvantageous that the apparatus becomes large in size and an automatic focusing mechanism for driving the above-described objective lens 14 must be added.

Figure 7:
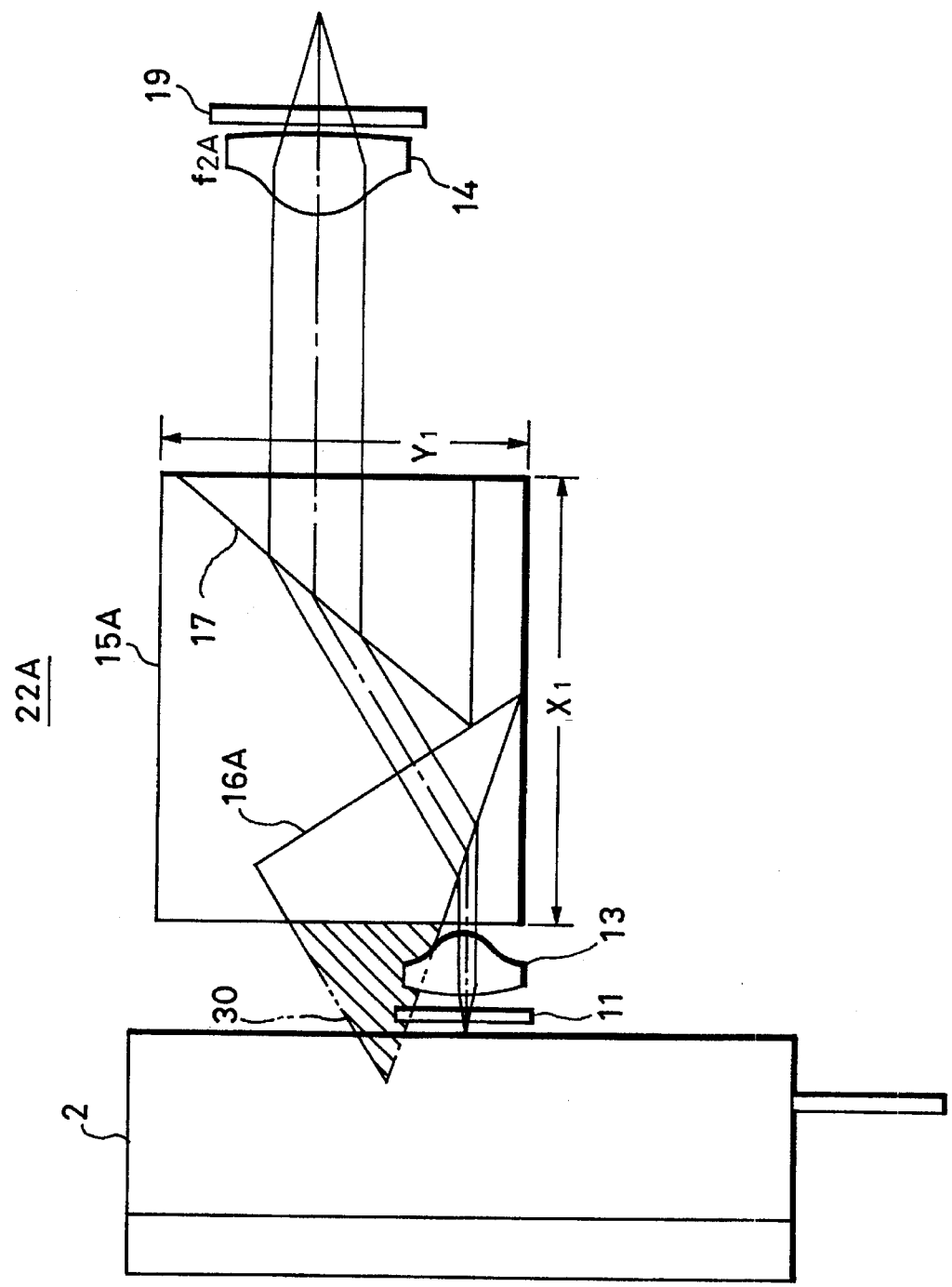
FIG. 7 is a schematic diagram showing a structure of a main portion of another embodiment of the laser plate making apparatus according to the invention.

FIG. 7 shows a structure for a laser head 22A of another embodiment of the present invention for overcoming the above noted problems. It is noted that, in FIG. 7, parts identical to those in FIG. 1 are designated with the same reference numerals.

In the example in FIG. 7, an unnecessary portion 30 indicated by a hatching portion of a triangular prism 16A comprising an anamorphic prism 15A (a triangular column portion formed of a part of the oblique side surface and bottom side surface of the triangular prism 16A) is cut away.

When this is done, an optical path length to the first surface of the anamorphic prism 15A (the oblique side surface of the cut-away triangular prism 16A) may be shortened from about 13 mm to about 5 mm. Thus, influence of the angle of divergence due to the image height component may be considerably reduced, the combination efficiency of the objective lens 14 can be improved, and effective NA of the objective lens 14 can be increased. Further, lowering of the focal depth can be also kept to a minimum. It is noted that the objective lens 14 may be satisfactorily expanded to an automatic focusing apparatus or the like. In addition, in the anamorphic prism 15A in FIG. 7, a length $X_1$ in the optical axis direction is about 24 mm and a height $Y_1$ in the direction perpendicular to the optical axis direction is about 17 mm.

Furthermore, this invention is not limited to the above embodiments but can take other various constructions without departing from the teachings of the invention.

As described above, according to the invention, the focal depth of the laser beam irradiated on the form plate sheet is extended or deepened by the beam shaping element which is disposed between the collimator lens and the above objective lens. Therefore, there can be achieved an effect that the apparatus may be easily adapted to a high resolution requirement.

When the anamorphic prism is employed as the beam shaping element, the unnecessary portion of the anamorphic prism is cut away to shorten the distance from the above laser light source to the form plate sheet. Therefore, there can be achieved an effect that the angle of divergence due to the image height of the laser light source after the light has passed through the collimator lens can be compensated.

According to the present invention, the focal depth of the laser beam 6 irradiated onto the form plate sheet 20 is deepened by the beam shaping element 15 which is disposed between the collimator lens 13 and the objective lens 14. Therefore, it is possible to respond to the requirement of high resolution.

When the anamorphic prism is employed as the beam shaping element 15, since the unnecessary portion 30 of the anamorphic prism is cut away to shorten the distance from the laser light source 2 to the form plate sheet 20, it is possible to compensate the angle of divergence due to an image height of the laser light source 2 after the collimator lens 13.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An apparatus for forming a press plate from a plate sheet, comprising:

a rotating cylinder rotatably supported around a rotational axis, said plate sheet being wound around said rotating plate cylinder;

a laser light source for providing a laser beam having a beam stripe which is elongated in a predetermined direction;

a collimator lens positioned adjacent to said laser light source for collimating said laser beam to a collimated beam, said collimator lens having focal length f1;

an objective lens for collecting said laser beam and for forming an image on said plate sheet to form recesses thereon, said objective lens having focal length f2, wherein f2/f1 is greater than 1 so that a focal depth of said laser beam is deep;

an anamorphic prism positioned between said collimator lens and said objective lens for expanding said collimated beam m times in said predetermined direction, wherein f2/f1×1/m is less than 1 so that a size of said image is small in said predetermined direction; and laser beam shifting means for sequentially shifting the position of said laser beam in the direction of said rotational axis so that a two-dimensional pattern of said recesses is formed on said plate sheet.

2. The apparatus according to claim 1, wherein said prism includes first and second triangle shaped prisms.

3. The apparatus according to claim 2, wherein said prisms include a right angle.

4. The apparatus according to claim 2, wherein said laser beam is incident upon an oblique surface of said first triangle prism.

5. An apparatus for forming a press plate from a plate sheet, comprising:

a rotating cylinder rotatably supported around a rotational axis, said plate sheet being wound around said rotating plate cylinder;

a laser light source for providing a laser beam having a beam stripe which is elongated in a predetermined direction;

a collimator lens positioned adjacent to said laser light source for collimating said laser beam to a collimated beam, said collimator lens having focal length f1;

an objective lens for collecting said laser beam and for forming an image on said plate sheet to form recesses thereon, said objective lens having focal length f2, wherein f2/f1 is greater than 1 so that a focal depth of said laser beam is deep;

beam shaping means positioned between said collimator lens and said objective lens for expanding said collimated beam m times in said predetermined direction, wherein f2/f1×1/m is less than 1 so that a size of said image is small in said predetermined direction; and laser beam shifting means for sequentially shifting the position of said laser beam in the direction of said rotational axis so that a two-dimensional pattern of said recesses is formed on said plate sheet.

6. The apparatus according to claim 5, wherein said beam shaping means includes first and second triangle shaped prisms.

7. The apparatus according to claim 6, wherein said prisms include a right angle.

8. The apparatus according to claim 6, wherein said laser beam is incident upon an oblique surface of said first triangle prism.

* * * * *